(12) United States Patent
Rawas

(10) Patent No.: US 10,663,110 B1
(45) Date of Patent: May 26, 2020

(54) METROLOGY APPARATUS TO FACILITATE CAPTURE OF METROLOGY DATA

(71) Applicant: DIVERGENT TECHNOLOGIES, INC., Los Angeles, CA (US)

(72) Inventor: Oussama Rawas, Allen, TX (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 16/222,953

(22) Filed: Dec. 17, 2018

(51) Int. Cl.
| | |
|---|---|
| *G01D 11/10* | (2006.01) |
| *F16M 13/02* | (2006.01) |
| *F16F 13/00* | (2006.01) |
| *B33Y 50/00* | (2015.01) |
| *F16F 15/02* | (2006.01) |

(52) U.S. Cl.
CPC ........... *F16M 13/027* (2013.01); *B33Y 50/00* (2014.12); *F16F 13/005* (2013.01); *F16F 15/022* (2013.01); *G01D 11/10* (2013.01)

(58) Field of Classification Search
CPC ...... F16M 13/027; G01D 11/10; F16F 13/005
USPC .......................................................... 73/430
See application file for complete search history.

(56) References Cited

U.S. PATENT DOCUMENTS

| | | | |
|---|---|---|---|
| 5,203,226 A | 4/1993 | Hongou et al. | |
| 5,742,385 A | 4/1998 | Champa | |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |

(Continued)

FOREIGN PATENT DOCUMENTS

| | | |
|---|---|---|
| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)

(Continued)

*Primary Examiner* — Jamel E Williams
(74) *Attorney, Agent, or Firm* — Arent Fox LLP

(57) ABSTRACT

In the present disclosure, systems and apparatuses for stabilizing a metrology device may be provided. The metrology device may be connected with a metrology apparatus that may prevent and/or correct for unintended movement of the metrology device. The metrology apparatus may include a base plate having a top surface and a bottom surface, and the base plate may include a plurality of holes from the top surface to the bottom surface. The metrology apparatus may further include a plurality of suspension rods, and a distal end of a respective suspension rod may be positioned through a respective hole such that a first portion of the distal end is disposed on the top surface of the base plate and a second portion of the distal end is disposed on the bottom surface of the base plate. The metrology device may be connected to the bottom surface of the base plate such that at least a portion of an assembly cell is within a field of view of the metrology device.

9 Claims, 10 Drawing Sheets

(56) References Cited

U.S. PATENT DOCUMENTS

| | | |
|---|---|---|
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,256,735 B2 | 9/2012 | Heiland |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |

(56) References Cited

U.S. PATENT DOCUMENTS

| | | |
|---|---|---|
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,125,913 B2 * | 11/2018 | Ramsauer ............... F16M 7/00 |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |

(56) References Cited

U.S. PATENT DOCUMENTS

| | | | |
|---|---|---|---|
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2009/0260243 A1* | 10/2009 | Evans .................. B25J 17/0216 33/502 |
| 2011/0073722 A1* | 3/2011 | Meuret .................. F16M 11/34 248/169 |
| 2014/0277669 A1 | 9/2014 | Nardi et al. |
| 2017/0113344 A1 | 4/2017 | Schönberg |
| 2017/0175800 A1* | 6/2017 | Nehls ...................... F16B 43/00 |
| 2017/0341309 A1 | 11/2017 | Piepenbrock et al. |
| 2019/0032841 A1* | 1/2019 | Becker .................. F16M 11/34 |
| 2019/0211863 A1* | 7/2019 | Hepworth ............... F16B 21/02 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report & Written Opinion received in PCT/US2019/066809 dated Jan. 22, 2020.

* cited by examiner

METROLOGY APPARATUS TO FACILITATE CAPTURE OF METROLOGY DATA

BACKGROUND

Field

The present disclosure relates to transport structures such as automobiles, trucks, trains, boats, aircraft, motorcycles, metro systems, and the like, and more specifically to techniques for capturing data representative of an assembly cell for transport structures.

Background

A transport structure such as an automobile, truck or aircraft employs a large number of interior and exterior nodes. These nodes provide structure to the automobile, truck and aircraft, and respond appropriately to the many different types of forces that are generated or that result from various actions like accelerating and braking. These nodes also provide support. Nodes of varying sizes and geometries may be integrated in a transport structure, for example, to provide an interface between panels, extrusions, and/or other structures. Thus, nodes are an integral part of transport structures.

Most nodes must be coupled to, or interface securely with, another part or structure in secure, well-designed ways. In order to securely connect a node with another part or structure, the node may need to undergo one or more processes in order to prepare the node to connect with the other part or structure. For example, the node may be machined at an interface in order to connect with various other parts or structures. Further examples of processes include surface preparation operations, heat treatment, electrocoating, electroplating, anodization, chemical etching, cleaning, support removal, powder removal, and so forth.

In order to produce a transport structure (e.g., a vehicle, an aircraft, a metro system, etc.), one or more various operations may be performed after a node is constructed, including pre-processing operations, assembly operations, and/or post-processing operations. For example, a node may be connected with a part, e.g., in order to form a portion of a transport structure (e.g., a vehicle chassis, etc.). Such assembly may involve a degree of accuracy that is within one or more tolerance thresholds of an assembly system, e.g., in order to ensure that the node is securely connected with the part and, therefore, the transport structure may be satisfactorily produced.

When robotic apparatuses (e.g., robotic arms) perform operations associated with assembly operations, the robotic apparatuses may engage with different nodes, parts, and/or other structures based on instructions provided by a computer. Thus, a need exists for an approach to facilitate various computer-aided operations associated with assembly of a transport structure, such as the generation of instructions by a computer.

SUMMARY

The present disclosure generally relates to assembly operations performed in association with production of transport structures. Such assembly operations may include connection of nodes (e.g., additively manufactured nodes) with parts and/or other structures. Because transport structures are to be safe, reliable, and so forth, approaches to accurately performing various assembly operations associated with production of transport structures may be beneficial. Such approaches to various assembly operations may be performed by at least one robotic arm that may be instructed via computer-generated instructions. Accordingly, a computer may implement various techniques to generate instructions for at least one robotic arm that causes the at least one robotic arm to be correctly position when performing various assembly operations.

In the present disclosure, approaches to capturing representations of various components in an assembly cell may be described. An assembly cell may include an area in which one or more operations associated with assembly of a transport structure are performed. Thus, the assembly cell may provide an area for pre-processing, processing, and/or post-processing assembly operations, such as machining operations, connecting operations (e.g., fixing a node to a part), cleaning operations, and/or other related operations. Such operations may be based on metrology data associated with components within the assembly cell, and the capture of the metrology data may be enabled through a metrology device.

According to aspects of the present disclosure, an apparatus for enabling the accurate capture of metrology data may be described. The apparatus may include or may be connected with a metrology device that captures metrology data. The apparatus may be positioned relative to an assembly cell in which operations related to assembly of transport structures are performed. For example, the apparatus may be at an overhead position relative to an assembly cell, and the metrology device may capture metrology data from aerial field of view of the assembly cell.

The apparatus may include a base plate having a top surface and a bottom surface, and the base plate may include a plurality of holes from the top surface to the bottom surface. The apparatus may include a plurality of suspension rods, and a distal end of a respective suspension rod may be positioned through a respective hole such that a first portion of the distal end is disposed on the top surface of the base plate and a second portion of the distal end is disposed on the bottom surface of the base plate. A metrology device may be connected to the bottom surface of the base plate such that at least a portion of an assembly cell is within a field of view of the metrology device.

In one embodiment, the respective suspension rod is connected with the base plate through at least one spherical washer that is connected with the second portion of the distal end of the respective suspension rod disposed on the bottom surface of the base plate. The respective suspension rod may be connected with the base plate through at least one spherical washer that is connected with the first portion of the distal end of the respective suspension rod disposed on the top surface of the base plate. The respective suspension rod may be divided by an isolation spring component that includes an isolation spring. A first section of the respective suspension rod may be disposed through a lower portion of the isolation spring component, and a second section of the respective suspension rod may be connected with an upper portion of the isolation spring component and connected with the isolation spring component through a first spherical washer.

In one embodiment, the apparatus may include a weight component positioned on the top surface of the base plate, and the weight component may be configured to provide stability against unintended movement of the apparatus. The metrology device may include at least one of a camera or a laser tracker. The metrology device may be configured to provide metrology data to a computer configured to control one or more robotic apparatuses at least partially within the assembly cell that is within the field of view of the metrology device. The apparatus may be positioned overhead relative to the assembly cell, and the field of view of the metrology device may include an aerial view of the assembly cell below the apparatus.

It will be understood that other aspects of mechanisms for realizing adhesive connections with additively manufactured components and the manufacture thereof will become readily apparent to those skilled in the art from the following detailed description, wherein it is shown and described only several embodiments by way of illustration. As will be realized by those skilled in the art, the disclosed subject matter is capable of other and different embodiments and its several details are capable of modification in various other respects, all without departing from the invention. Accordingly, the drawings and detailed description are to be regarded as illustrative in nature and not as restrictive.

DETAILED DESCRIPTION

Figure 1:
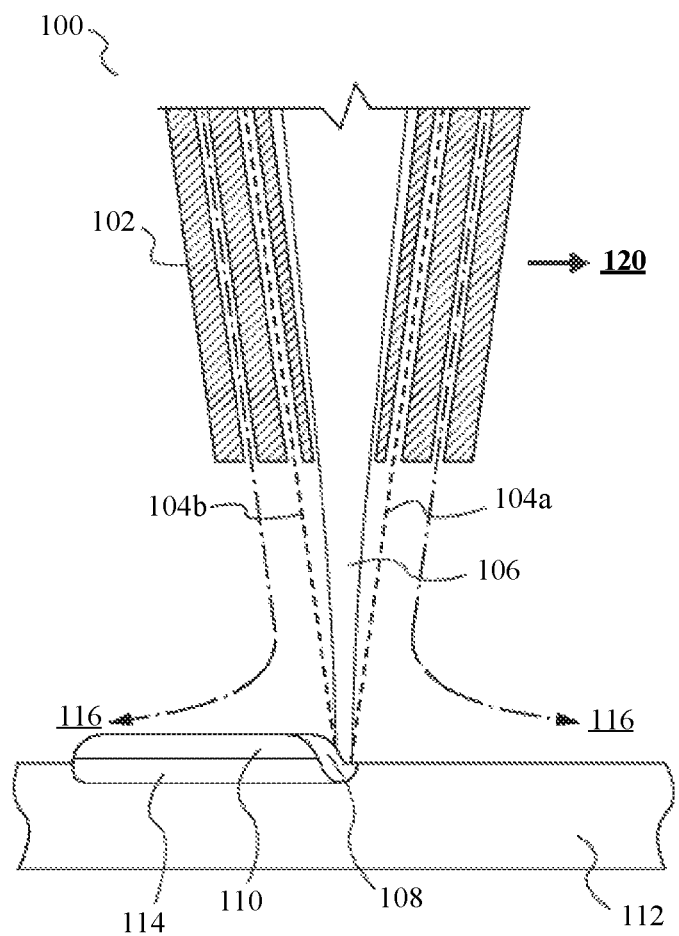
FIG. 1 illustrates an exemplary embodiment of certain aspects of a Direct Metal Deposition (DMD) 3-D printer.

The detailed description set forth below in connection with the appended drawings is intended to provide a description of various exemplary embodiments and is not intended to represent the only embodiments in which the invention may be practiced. The terms "exemplary," "illustrative," and the like used throughout the present disclosure mean "serving as an example, instance, or illustration," and should not necessarily be construed as preferred or advantageous over other embodiments presented in the present disclosure. The terms "connected to," "connected with," and the like used through the present disclosure may not mean denote a direct connection, unless such a direct connection is described.

The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout the present disclosure. In addition, the figures may not be drawn to scale and instead may be drawn in a way that attempts to most effectively highlight various features relevant to the subject matter described.

Additive Manufacturing (3-D Printing).

Additive manufacturing (AM) is advantageously a non-design specific manufacturing technique. AM provides the ability to create complex structures within a part. For example, nodes can be produced using AM. A node is a structural member that may include one or more interfaces used to connect to other spanning components such as tubes, extrusions, panels, other nodes, and the like. Using AM, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected using a brazing slurry, a thermoplastic, a thermoset, or another connection feature, any of which can be used interchangeably in place of an adhesive. Thus, while welding techniques may be suitable with respect to certain embodiments, additive manufacturing provides significant flexibility in enabling the use of alternative or additional connection techniques.

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Single Pass Jetting is another exemplary technology claimed by its developers to be much quicker than conventional laser-based systems. Atomic Diffusion Additive Manufacturing (ADAM) is still another recently developed technology in which components are printed, layer-by-layer, using a metal powder in a plastic binder. After printing, plastic binders are removed and the entire part is sintered at once into a desired metal.

One of several such AM techniques, as noted, is DMD. FIG. 1 illustrates an exemplary embodiment of certain aspects of a DMD 3-D printer 100. DMD printer 100 uses feed nozzle 102 moving in a predefined direction 120 to propel powder streams 104a and 104b into a laser beam 106, which is directed toward a workpiece 112 that may be supported by a substrate. Feed nozzle may also include mechanisms for streaming a shield gas 116 to protect the welded area from oxygen, water vapor, or other components. The powdered metal is then fused by the laser 106 in a melt pool region 108, which may then bond to the workpiece 112 as a region of deposited material 110. The dilution area 114 may include a region of the workpiece where the deposited powder is integrated with the local material of the workpiece. The feed nozzle 102 may be supported by a computer numerical controlled (CNC) robot or a gantry, or other computer-controlled mechanism. The feed nozzle 102 may be moved under computer control multiple times along a predetermined direction of the substrate until an initial layer of the deposited material 110 is formed over a desired area of the workpiece 112. The feed nozzle 102 can then scan the region immediately above the prior layer to deposit successive layers until the desired structure is formed. In general, the feed nozzle 102 may be configured to move with respect to all three axes, and in some instances to rotate on its own axis by a predetermined amount.

Figure 2:
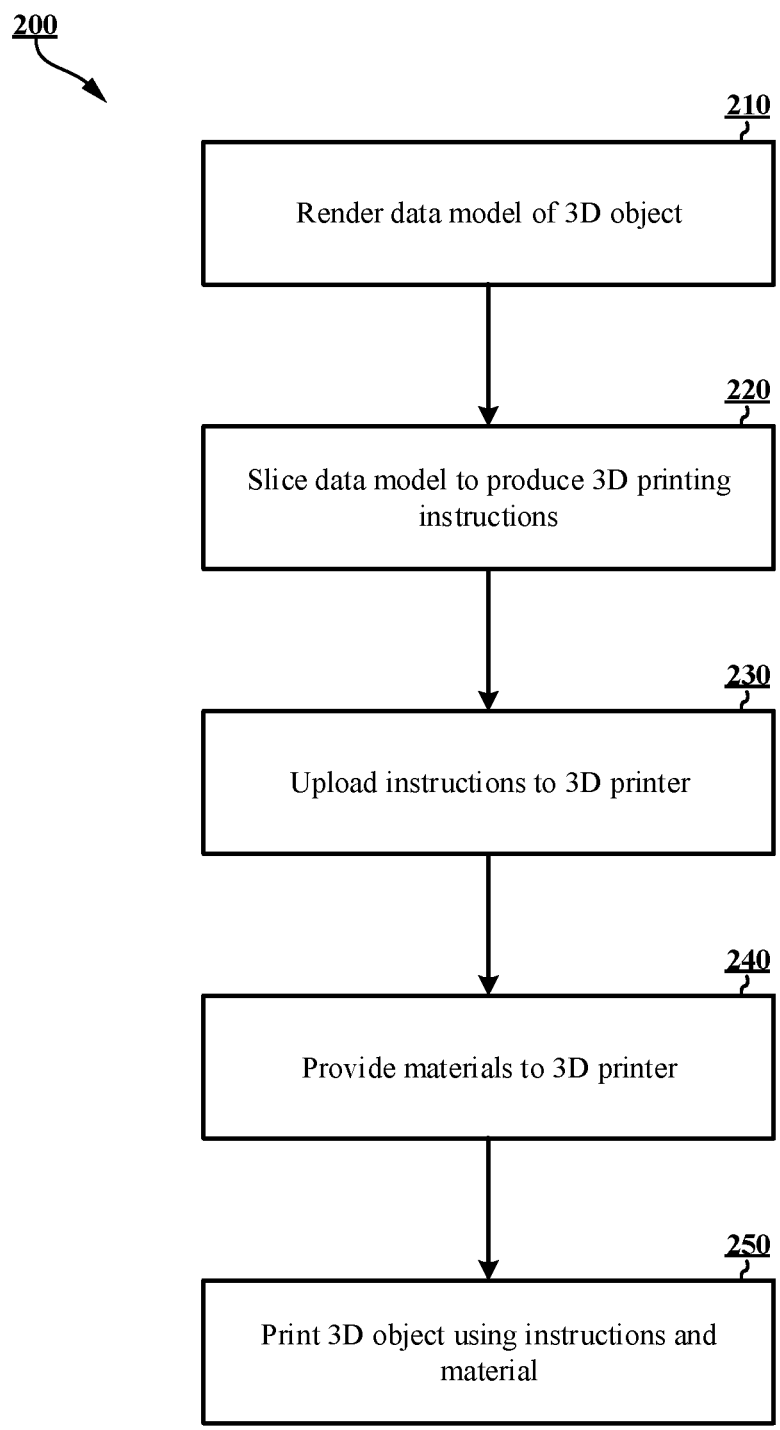
FIG. 2 illustrates a conceptual flow diagram of a 3-D printing process using a 3-D printer.

FIG. 2 is a flow diagram 200 illustrating an exemplary process of 3-D printing. A data model of the desired 3-D object to be printed is rendered (operation 210). A data model is a virtual design of the 3-D object. Thus, the data model may reflect the geometrical and structural features of the 3-D object, as well as its material composition. The data model may be created using a variety of methods, including CAE-based optimization, 3D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (operation 220). Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses.

A common type of file used for slicing data models into layers is a G-code file, which is a numerical control programming language that includes instructions for 3-D printing the object. The G-code file, or other file constituting the instructions, is uploaded to the 3-D printer (operation 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (operation 240). In DMD techniques, for example, one or more metal powders may be selected for layering structures with such metals or metal alloys. In selective laser melting (SLM), selective laser sintering (SLS), and other PBF-based AM methods (see below), the materials may be loaded as powders into chambers that feed the powders to a build platform. Depending on the 3-D printer, other techniques for loading printing materials may be used.

The respective data slices of the 3-D object are then printed based on the provided instructions using the material(s) (operation 250). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modelling, as described above, parts are printed by applying successive layers of model and support materials to a substrate. In general, any suitable 3-D printing technology may be employed for purposes of the present disclosure.

Another AM technique includes powder-bed fusion ("PBF"). Like DMD, PBF creates 'build pieces' layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 3A-D illustrate respective side views of an exemplary PBF system 300 during different stages of operation. As noted above, the particular embodiment illustrated in FIGS. 3A-D is one of many suitable examples of a PBF system employing principles of the present disclosure. It should also be noted that elements of FIGS. 3A-D and the other figures in the present disclosure are not necessarily drawn to scale, but may be drawn larger or smaller for the purpose of better illustration of concepts described herein. PBF system 300 can include a depositor 301 that can deposit each layer of metal powder, an energy beam source 303 that can generate an energy beam, a deflector 305 that can apply the energy beam to fuse the powder, and a build plate 307 that can support one or more build pieces, such as a build piece 309. PBF system 300 can also include a build floor 311 positioned within a powder bed receptacle. The walls of the powder bed receptacle 312 generally define the boundaries of the powder bed receptacle, which is sandwiched between the walls 312 from the side and abuts a portion of the build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
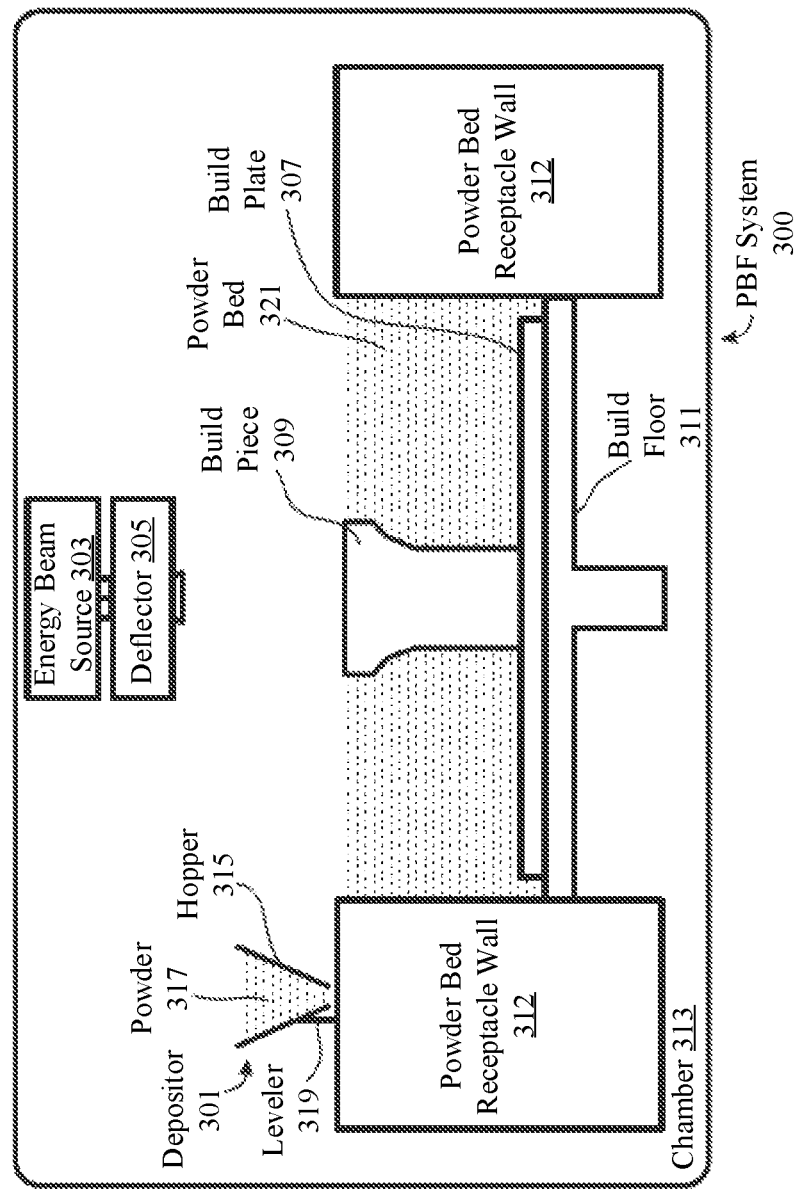
FIGS. 3A-D illustrate exemplary powder bed fusion (PBF) systems during different stages of operation.

Referring specifically to FIG. 3A, this figure shows PBF system 300 after a slice of build piece 309 has been fused, but before the next layer of powder has been deposited. In fact, FIG. 3A illustrates a time at which PBF system 300 has already deposited and fused slices in multiple layers, e.g., 150 layers, to form the current state of build piece 309, e.g., formed of 150 slices. The multiple layers already deposited have created a powder bed 321, which includes powder that was deposited but not fused.

Figure 3B:
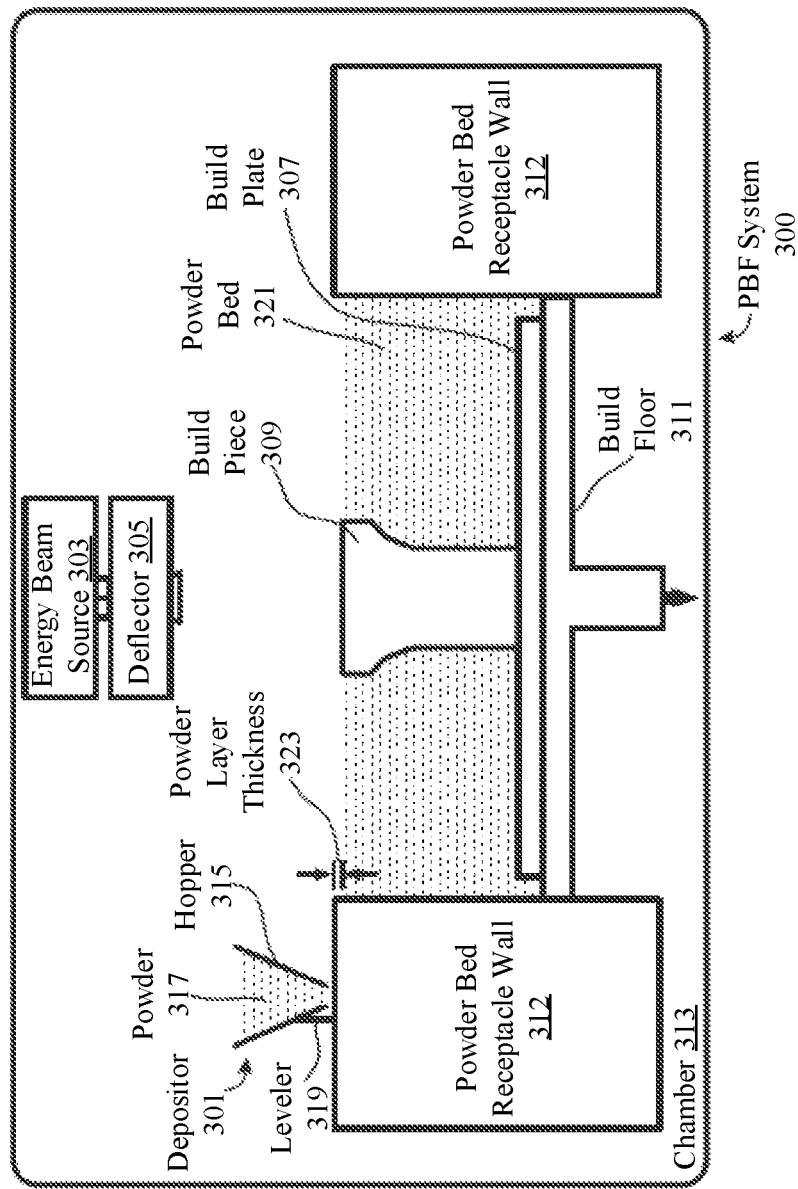

FIG. 3B shows PBF system 300 at a stage in which build floor 311 can lower by a powder layer thickness 323. The lowering of build floor 311 causes build piece 309 and powder bed 321 to drop by powder layer thickness 323, so that the top of the build piece and powder bed are lower than the top of powder bed receptacle wall 312 by an amount equal to the powder layer thickness. In this way, for example, a space with a consistent thickness equal to powder layer thickness 323 can be created over the tops of build piece 309 and powder bed 321.

Figure 3C:
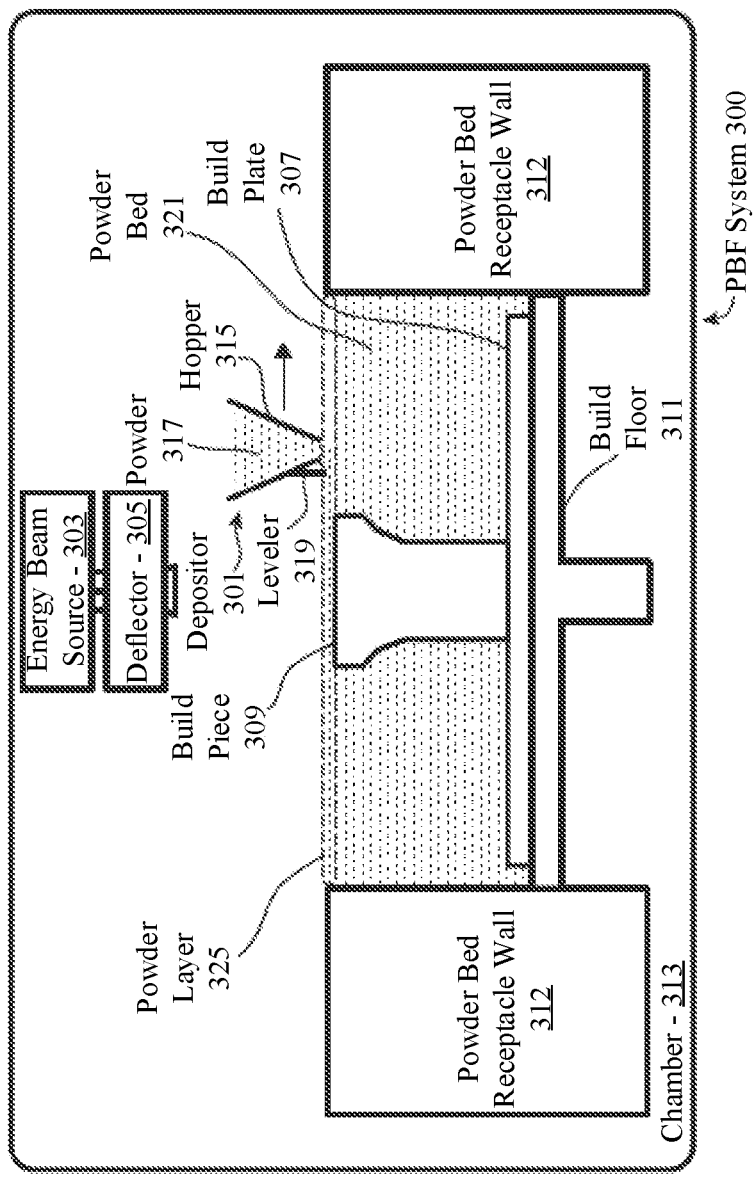

FIG. 3C shows PBF system 300 at a stage in which depositor 301 is positioned to deposit powder 317 in a space created over the top surfaces of build piece 309 and powder bed 321 and bounded by powder bed receptacle walls 312. In this example, depositor 301 progressively moves over the defined space while releasing powder 317 from hopper 315. Leveler 319 can level the released powder to form a powder layer 325 that has a thickness substantially equal to the powder layer thickness 323 (see FIG. 3B). Thus, the powder in a PBF system can be supported by a powder support structure, which can include, for example, a build plate 307, a build floor 311, a build piece 309, walls 312, and the like. It should be noted that the illustrated thickness of powder layer 325 (i.e., powder layer thickness 323 (FIG. 3B)) is greater than an actual thickness used for the example involving 350 previously-deposited layers discussed above with reference to FIG. 3A.

Figure 3D:
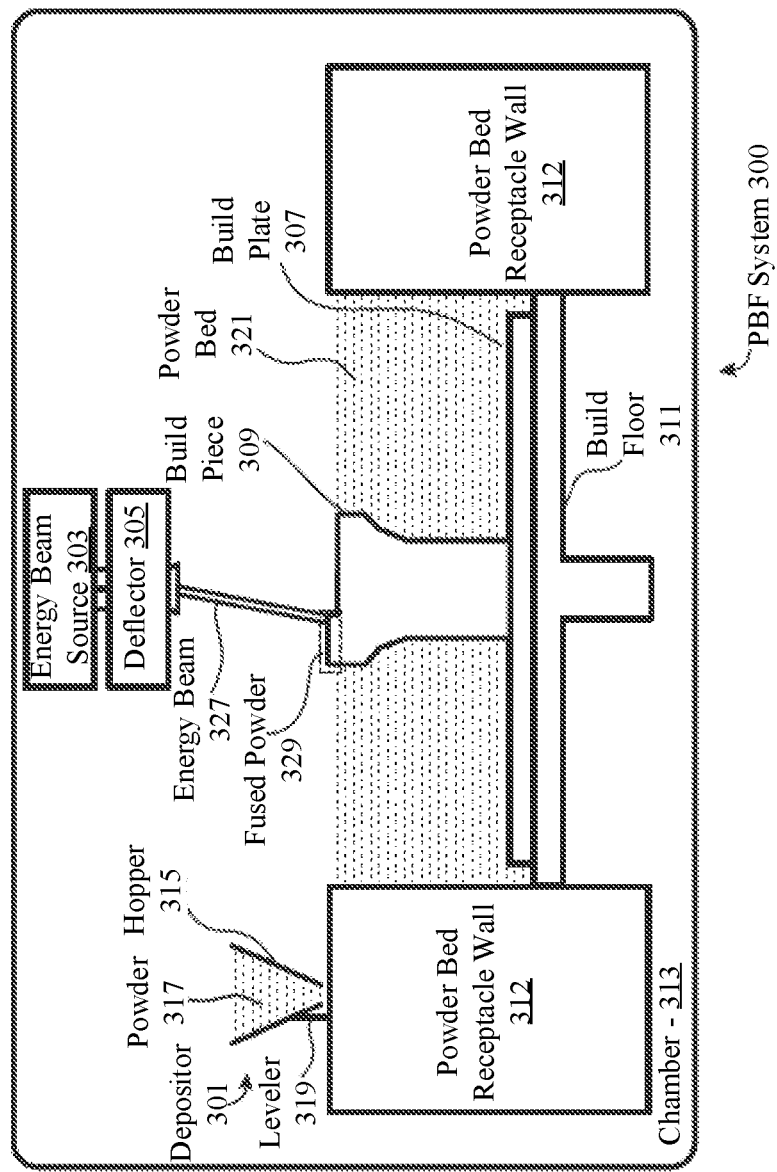

FIG. 3D shows PBF system 300 at a stage in which, following the deposition of powder layer 325 (FIG. 3C), energy beam source 303 generates an energy beam 327 and deflector 305 applies the energy beam to fuse the next slice in build piece 309. In various exemplary embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas designated to be fused. In various embodiments, energy beam source 303 can be a laser, in which case energy beam 327 is a laser beam. Deflector 305 can include an optical system that uses reflection and/or refraction to manipulate the laser beam to scan selected areas to be fused.

In various embodiments, the deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

The present disclosure provides various different embodiments of a metrology apparatus, which may be positioned relative to an assembly cell in which various pre-processing, processing, and/or post-processing operations associated with assembly of transport structures may occur (hereinafter, assembly operations). It will be appreciated that various embodiments described herein may be practiced together. For example, an embodiment described with respect to one illustration of the present disclosure may be implemented in another embodiment described with respect to another illustration of the present disclosure.

Transport structures may be node-based, and therefore various assembly operations may be include connection of nodes (e.g., additively manufactured nodes) with parts, other nodes, and/or other structures. Because transport structures are to be safe, reliable, and so forth, approaches to accurately performing various assembly operations associated with production of transport structures may be beneficial. Such approaches to various assembly operations may be performed by at least one robotic apparatus that may be instructed via computer-generated instructions. Accordingly, a computer may implement various techniques to generate instructions for at least one robotic apparatus that causes the at least one robotic apparatus to accurately operate when performing various assembly operations.

In the present disclosure, approaches to capturing metrology data associated with various components in an assembly cell may be described. Metrology data may include, for example, image data (e.g., still and/or moving images), laser-tracker measurement data, optical target data, and/or other metrology data. An apparatus may be configured to capture of metrology data and/or connect with a device configured to capture metrology data. The apparatus may be positioned relative to an assembly cell in which assembly operations for transport structures are performed.

Figure 4:
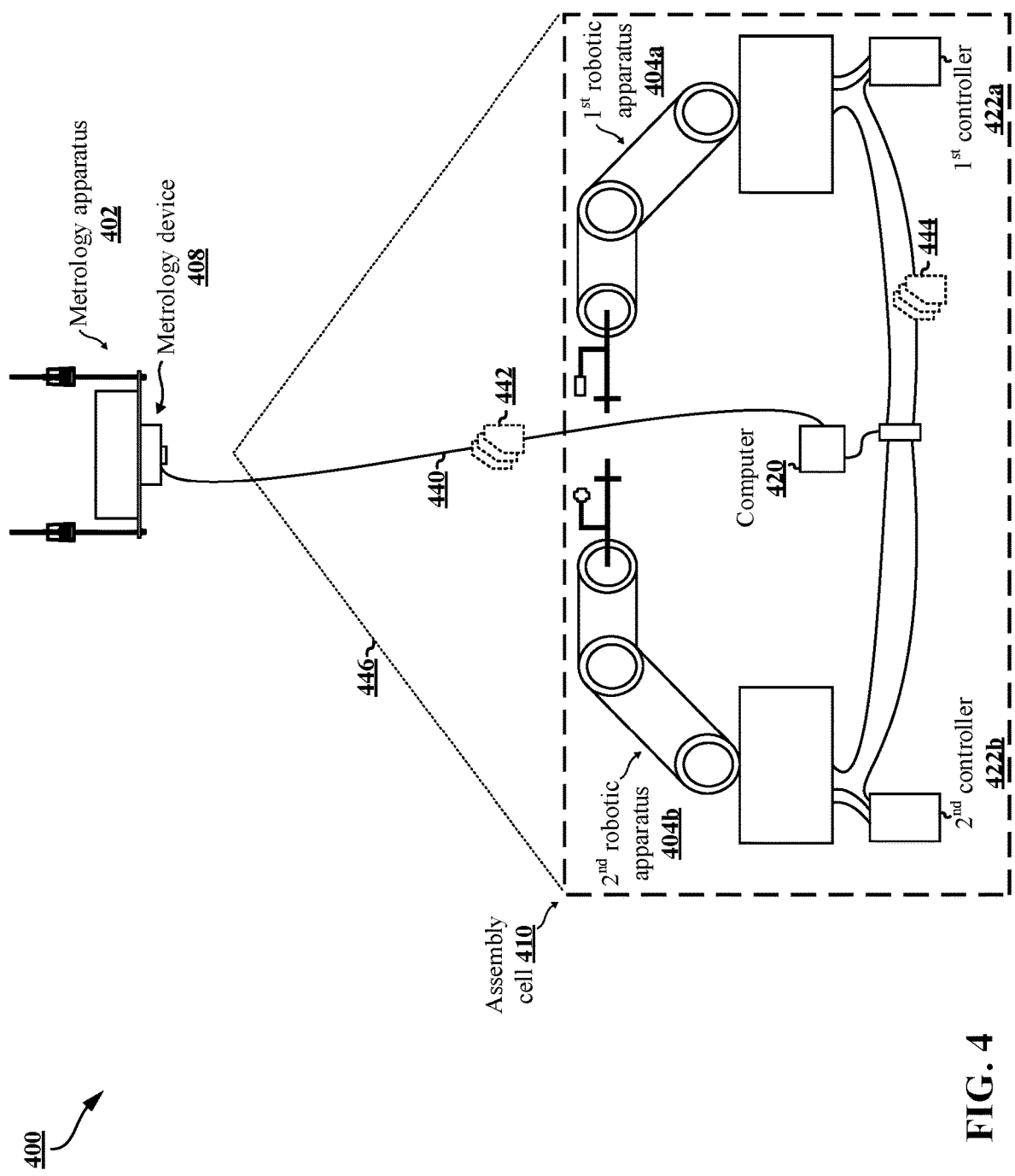
FIG. 4 illustrates a perspective view of an assembly cell that is at least partially within a field of view of a metrology apparatus.

FIG. 4 illustrates a perspective view of a system 400 in which metrology data associated with assembly operations for transport structures may be captured. Various assembly operations may occur at least partially within an assembly cell 410. The assembly cell 410 may include an area in which one or more assembly operations for a transport structure are performed, such as machining operations, connecting operations (e.g., fixing a node to a part), cleaning operations, and/or other related operations. The assembly cell 410 illustrates one possible embodiment of an assembly cell, and an assembly cell may include more or fewer components, may include other components associated with an assembly process, etc.

One or more robotic apparatuses 404a-b may perform some assembly operations at least partially within the assembly cell 410. In a first example, the first robotic apparatus 404a may be engaged with a part (e.g., "pick up" a part, "hold" a part, etc.), while the second robotic apparatus 404b is engaged with a node. When the node is to be connected with the part during assembly of a node-based transport structure, the first robotic apparatus 404a may move to bring the part to the node that is engaged by the second robotic apparatus 404b. The first robotic apparatus 404a may extend a robotic arm of the first robotic apparatus 404a to bring the part to the node engaged by the second robotic apparatus 404b, and the part may be adhered to the node by the first and/or second robotic apparatuses 404a-b. The first example is to be regarded as illustrative, and many other assembly operations may be performed by one or more robotic apparatuses 404a-b in the assembly cell 410.

In order to achieve assembly operations, such as the first example of the connection of the node with the part, the movement of one or more robotic apparatuses 404a-b may be controlled through instructions provided by a computer 420. The instructions provided by the computer 420 may be based on one or more positions of the one or more robotic apparatuses 404a-b within the assembly cell 410. For example, the computer 420 may generate instructions 444, provide the instructions 444 to a first controller 422a, and the first controller 422a may cause movement of the first robotic apparatus 404a based on the instructions 444. According to the aforementioned first example, the computer 420 may generate instructions 444 that cause the robotic arm of the first robotic apparatus 404a to extend toward the second robotic apparatus 404b and connect the part with the node.

The computer 420 may determine one or more positions of one or more components within the assembly cell 410 to generate instructions 444. For example, the computer 420 may determine the position of the first robotic apparatus 404a, e.g., as a position relative to the second robotic apparatus 404b, a position relative to the assembly cell 410, and/or an absolute position. In some embodiments, the computer 420 may determine absolute and/or relative positions of the second robotic apparatus 404b, the part, the node, and/or any other component that may potentially affect an assembly operation performed within the assembly cell 410.

The computer 420 may generate instructions 444 and/or determine positions of components within the assembly cell 410 based on metrology data. Metrology data may include any data indicating measurements and/or from which measurements can be derived. Accordingly, the computer 420 may derive positions of components within the assembly cell 410 from metrology data associated with the assembly cell 410. Metrology data may include image data (e.g., still and/or moving images), laser-tracker measurement data, optical target data, and/or other metrology data indicating measurements and/or from which measurements may be derived.

For example, the computer 420 may determine a position of the first robotic apparatus 404a within the assembly cell 410 based on metrology data, the computer 420 may determine a position of the first robotic apparatus 404a, the second robotic apparatus 404b, a part engaged by the first robotic apparatus 404a, a node engaged by the second robotic apparatus 404b, and so forth. The computer 420 may determine one or more positions as absolute positions, as positions relative to the assembly cell 410, as positions relative to one or more other components within the assembly cell 410, etc. The computer 420 may be provided the metrology data upon which instructions 444 are based. Thus, the metrology data may indicate the positions of components within the assembly cell 410.

A metrology apparatus 402 may facilitate the capture of metrology data 442. For example, the metrology apparatus 402 may include and/or may be connected with a metrology device 408. The metrology device 408 capture metrology data 442 and may provide the captured metrology data 442 to the computer 420. For example, the metrology device 408 may be connected with the computer 420 over an interconnect 440, and the metrology device 408 may send the metrology data 442 over the interconnect 440. The interconnect 440 may be a wired or wireless connection over which data may be communicated—e.g., the interconnect 440 may be a local area network, a personal area network, a network cable, or any other connection over which data may be communicated.

In one embodiment, the metrology device 408 may include a camera configured to capture image data of components within the assembly cell 410, such as still and/or moving images. In another embodiment, the metrology device 408 may include a laser tracker configured to capture measurements associated with components within the assembly cell 410. In some embodiments, the metrology device 408 may include a plurality of devices configured to capture metrology data (e.g., a camera and a laser tracker) and/or a device configured to capture different types of metrology data (e.g., image data and optical target data).

The metrology device 408 may capture metrology data 442 that is within a field of view 446. The field of view 446 of the metrology device 408 may be the area over which the metrology device 408 is able to capture the metrology data 442, and may also be known as a coverage envelope. Illustratively, the field of view 446 may include at least a portion of the assembly cell 410, and therefore, at least the first and second robotic apparatuses 404a-b (as well as a part and a node with which the first and second robotic apparatuses 404a-b are respectively engaged) may be within the field of view 446.

Because the metrology device 408 may capture metrology data 442 associated with at least a portion of the components within the assembly cell 410, the metrology apparatus 402 may be positioned so that the assembly cell 410 is at least partially within the field of view 446 of the metrology device 408. In the illustrated embodiment, the metrology apparatus 402 may be at an overhead position relative to the assembly cell 410. In such a position the metrology device 408 may provide an aerial view of the assembly cell 410. In an overhead position, the field of view 446 of the metrology device 408 may be increased relative to other positions, while also reducing the footprint (e.g., amount of space consumed) by the metrology apparatus 402 and the metrology device 408.

In some embodiments, the metrology apparatus 402 may be above the approximate center of the assembly cell 410. In other embodiments, the metrology apparatus 402 may be off-center relative to the assembly cell 410, but may still be at an overhead position. In still further embodiments, the metrology apparatus 402 may not be directly overhead relative to the assembly cell 410. For example, the metrology apparatus 402 may be positioned at a side of the assembly cell 410, although the metrology apparatus 402 may still be considered at an above position relative to the assembly cell 410.

In one embodiment, the metrology device 408 may capture the metrology data 442 representing components within the assembly cell 410 that are within the field of view 446 based on an input. For example, the computer 420 may instruct the metrology device 408 to capture the metrology data 442. In response to an instruction from the computer 420, the metrology device 408 may capture the metrology data 442 and provide the captured metrology data 442 to the computer 420. The metrology device 408 may receive a plurality of instructions over a time period, e.g., so that the metrology device 408 captures metrology data 442 during an assembly operation, such as after each movement of at least one component within the assembly cell 410 (e.g., after each movement of the first robotic apparatus 404a). In another embodiment, the metrology device 408 may capture the metrology data 442 periodically. For example, the metrology device 408 may repeatedly capture the metrology data 442 after each occurrence of a predetermined time period elapsing.

Various assembly operations for node-based transport structures may involve a relatively great degree of accuracy (e.g., system tolerances may be relatively low). Consequently, movement of the metrology device 408 may cause inaccuracies in the metrology data 442 that are not representative of the actual positions and/or measurements of the components within the assembly cell 410. By way of illustration, the metrology device 408 may capture a first set of metrology data, and the computer 420 may generate a first set of instructions based on the first set of metrology data. The first robotic apparatus 404a may move based on the first set of instructions. The metrology device 408 may capture a second set of metrology data that represents the movement of the first robotic apparatus 404a, and the computer 420 may generate a second set of instructions based on the second set of metrology data to cause the first robotic apparatus 404a to move again. If the metrology device 408 experiences unintended movement or disturbance after providing the first set of metrology data to the computer but before capturing the second set of metrology data, then the second set of metrology data may indicate positions and/or measurements that are erroneous and do not accurately reflect the positions and/or measurements within the assembly cell 410 relative to the first set of metrology data. Similarly, the metrology device 408 may be disturbed during the actual capture of metrology data, such as camera shake or jitter, which may introduce inaccuracies to a set of metrology data. Such erroneous metrology data may cause the computer 420 to generate a set of instructions that causes inaccurate movement of a component (e.g., the first robotic apparatus 404*a*) within the assembly cell 410.

Potentially, inaccurate movement caused by a metrology device that is disturbed when capturing metrology data may cause damage during an assembly operation, may render a portion of a transport structure unsafe and/or unreliable, and/or may otherwise negatively impact an assembly operation. Therefore, disturbances may be mitigated during the capture of metrology data and/or between successive captures of metrology data by the metrology device 408. This mitigation may reduce the errors in instructions 444 that are based on metrology data 442. The metrology apparatus 402 may be configured to provide such protection. Further, the metrology apparatus 402 may correct for unintended movement of the metrology device 408, e.g., by causing the metrology device 408 to return to an original position. For example, the metrology apparatus 402 may provide a stable base for the metrology device 408, may prevent unintended movement of the metrology device 408, and/or may otherwise facilitate the accurate capture of metrology data by securing and/or stabilizing the metrology device 408.

Figure 5:
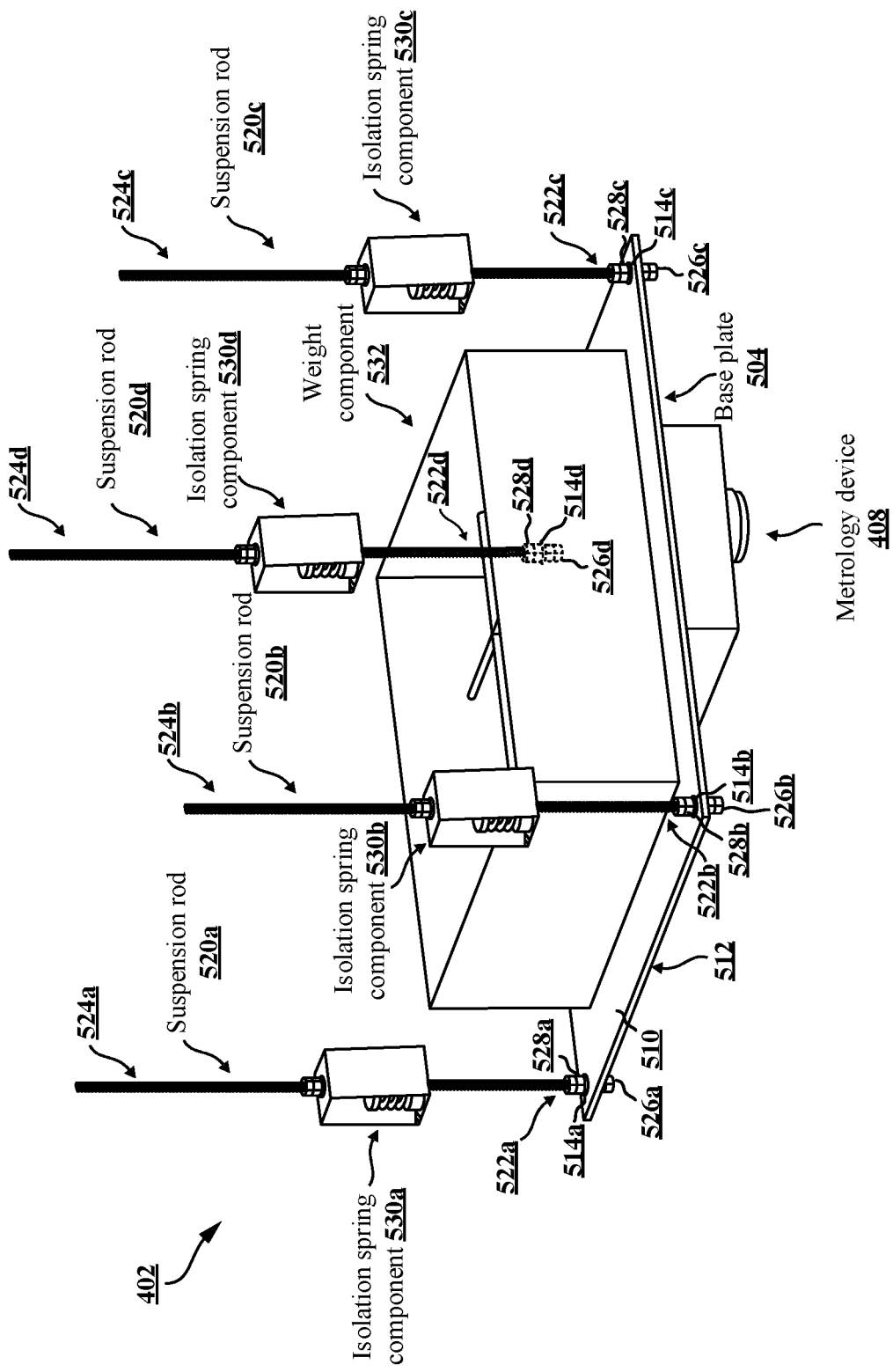
FIG. 5 illustrates a perspective view of a metrology apparatus.

FIG. 5 illustrates a perspective view of the metrology apparatus 402, according to various embodiments. As described, supra, the metrology apparatus 402 may include the metrology device 408, or the metrology apparatus 402 may be configured to be connected with the metrology device 408. In some embodiments, the metrology apparatus 402 may be configured to engage with a plurality of different metrology devices, and the metrology device 408 may illustrate one example. For example, the metrology apparatus 402 may include one or more features configured to engage and/or mate with various metrology devices so that each of the various metrology devices may be connected with the metrology apparatus 402, but may also be disconnected from the metrology apparatus 402 (e.g., in order to change to a different metrology device).

The metrology apparatus 402 may include a base plate 504. The base plate 504 may be relatively rectangular in shape (e.g., relatively square), although the base plate 504 may be configured as another shape in another embodiment (e.g., the base plate 504 may be circular).

In some embodiments, the base plate 504 may include one or more fastening or mating features to engage with the metrology device 408 so that the metrology device 408 may be connected with the metrology apparatus 402. For example, the base plate 504 may include one or more holes disposed relatively near the center of the base plate 504, and the holes may threaded in order to receive screws and/or bolts to fasten the metrology device 408 to the base plate 504.

The base plate 504 may be configured to support the weight of the metrology device 408 without deforming, e.g., when the metrology device 408 is connected with the metrology apparatus 402 and the metrology device 408 is suspended above the assembly cell 410. Thus, the base plate 504 may be rigid. In various embodiments, therefore, the base plate 504 may be composed of an unpliable material, such as a metal (e.g., steel, aluminum, etc.) or rigid plastic.

The base plate 504 may include a top surface 510 and a bottom surface 512. The top surface 510 may be a surface facing opposite the bottom surface 512. The bottom surface 512 may be connected with the metrology device 408. Thus, in some embodiments, the bottom surface 512 may include fastening or mating features to connect with the metrology device 408. However, one or more fastening or mating features may additionally be on the top surface 510, such as with threaded holes that are through the base plate 504 from the bottom surface 512 to the top surface 510. In the present disclosure, "top" and "bottom" do not necessarily indicate a position or direction, but rather only indicate direction in the illustrated embodiment in which the metrology apparatus 402 is above the assembly cell 410.

The base plate 504 may include a plurality of holes 514*a-d* through the base plate 504 from the top surface 510 to the bottom surface 512. Each of the holes 514*a-d* may be disposed relatively close to a respective edge of the base plate 504. For example, when the base plate 504 is configured as a rectangle (e.g., a square), each of the holes 514*a-d* may be disposed relatively near a respective one of the four corners of the base plate 504.

The metrology apparatus 402 may further include a plurality of suspension rods 520*a-d*. Collectively, the suspension rods 520*a-d* may be able to support the other components of the metrology apparatus 402 (including a weight component 532), as well as the metrology device 408. Each of the suspension rods 520*a-d* may be relatively rigid, and may be composed of an unpliable material, such as metal or rigid plastic.

Each of the suspension rods 520*a-d* may include a respective distal end 522*a-d* and a respective proximal end 524*a-d*. Each of the proximal ends 524*a-d* may be configured to be connected with an overhead surface that is above the assembly cell 410 so that the metrology apparatus 402 may be suspended over the assembly cell 410. In some embodiments, the proximal ends 524*a-d* of the suspension rods 520*a-d* may be threaded, e.g., so that the metrology apparatus 402 may be fastened to the overhead surface above the assembly cell 410 using nuts and/or bolts.

Each of the distal ends 522*a-d* may be positioned through a respective one of the holes 514*a-d*. Thus, a first portion of each distal end 522*a-d* may be disposed on the top surface 510 of the base plate 504, whereas a second portion of each distal end 522*a-d* may be disposed on the bottom surface 512 of the base plate 504. When connected with the overhead surface and the base plate 504, the suspension rods 520*a-d* may suspend the metrology apparatus 402 above the assembly cell 410.

The base plate 504 may be relatively level. Therefore, the holes 514*a-c* may be positioned on the base plate 504 in such a way so that the base plate 504 is maintained at a relatively level position when the suspension rods 520*a-d* are connected with the base plate 504 at the distal ends 522*a-d* and connected with the overhead surface (e.g. ceiling) at the proximal ends 524*a-d*. Correspondingly, the suspension rods 520*a-d* may be of a relatively even length to maintain the relatively level position of the base plate 504.

In some embodiments, the distal ends 522*a-d* of the suspension rods 520*a-d* may include threads, e.g., so that the metrology apparatus 402 may be connected with the base plate 504 with various fastening mechanisms. For example, a respective set of fasteners 526*a-d*, 528*a-d* may be fastened with a respective one of the suspension rods 520*a-d*, which may connect each of the suspension rods 520*a-d* with the base plate 504. Each of the fasteners 526*a-d*, 528*a-d* may be, for example, a nut with a threaded hole configured to mate with a respective one of the suspension rods 520*a-d*, which may be correspondingly threaded.

In one embodiment, each of the suspension rods 520*a-d* may be connected with the base plate 504 at the top surface 510 with an upper set of fasteners 528*a-d*. Further, each suspension rod 520*a-d* may be connected with the base plate 504 at the bottom surface 512 with a lower set of fasteners 526*a-d*. In one embodiment, each of the sets of fasteners 526*a-d*, 528*a-d* may include two fasteners. The sets of fasteners 526*a-d*, 528*a-b* may connect the suspension rods 520*a-d* with the base plate 504 to maintain the relatively level position of the base plate 504 and minimize or prevent unintended movement of the base plate 504, thereby minimizing or preventing unintended movement of the metrology device 408.

In some embodiments, each of the suspension rods 520*a-d* may be connected with the base plate 504 through at least one spherical washer that is connected with a second portion of a respective distal end 522*a-d* disposed on the bottom surface 512 of the base plate 504. The at least one spherical washer may be connected with a respective one of the suspension rods 520*a-d* between the base plate 504 and a respective lower set of fasteners 526*a-d*. Various embodiments of the connection of the suspension rods 520*a-d* with the base plate 504 may be illustrated with respect to FIG. 7, infra.

In some embodiments, each of the suspension rods 520*a-d* may be connected with the base plate 504 through at least one spherical washer that is connected with a first portion of a respective distal end 522*a-d* disposed on the top surface 510 of the base plate 504. The at least one spherical washer may be connected with a respective one of the suspension rods 520*a-d* between the base plate 504 and a respective upper set of fasteners 528*a-d*.

The spherical washers through which the suspension rods 520*a-d* may be connected with the base plate 504 may provide a corrective measure against unintended movement of the metrology apparatus 402. For example, the spherical washers may facilitate the accurate repositioning of the metrology apparatus 402 by causing the metrology apparatus 402 to return (e.g., "settle") into an approximately original position after experiencing an unintended movement.

The metrology apparatus 402 may further include a weight component 532. The weight component 532 may be positioned on the top surface 510 of the base plate 504. The weight component 532 may be positioned on the top surface 510 in order to maintain the base plate 504 at an approximately level position. For example, the weight component 532 may be approximately centered on the top surface 510 of the base plate 504.

The weight component 532 may include or may be configured to receive a weight.

With the weight, the weight component 532 may apply a downward force on the metrology apparatus 402, e.g., when the metrology apparatus 402 is suspended from an overhead surface. For example, the weight component 532 may increase tension applied to the suspension rods 520*a-d* of the metrology apparatus 402. The application of the downward force may provide stability against unintended movement (e.g., oscillation) of the metrology apparatus 402. Therefore, the metrology apparatus 402 may minimize or prevent unintended movement (e.g., oscillation) of the metrology device 408.

The weight component 532 (with the weight) may weigh a suitable amount to prevent unintended movement of the metrology device 408, without weighing more than the suspension rods 520*a-d* and the base plate 504 are capable of supporting. For example, the weight component 532 may include or may be configured to receive a weight that is concrete, lead, or any other material suitable to increase the downward force applied to the metrology apparatus 402 (e.g., through the suspension rods 520*a-d*) and thereby prevent unintended movement (e.g., oscillation) of the metrology apparatus 402.

In some embodiments, the metrology apparatus 402 may further include a plurality of isolation spring components 530*a-d*. Each of the suspension rods 520*a-d* may be divided by a respective one of the isolation spring components 530*a-d*. Thus, each of the suspension rods 520*a-d* may be divided into a first section that includes a respective one of the distal ends 522*a-d* and a second section that includes a respective one of the proximal ends 524*a-d*. In other words, the first section and the second section of each of the suspension rods 520*a-d* may be separated and, therefore, may not be directly connected but may be connected through a respective one of the isolation spring components 530*a-d*. In one embodiment, each of the suspension rods 520*a-d* may be divided at a point that is approximately at the middle of the respective one of the suspension rods 520*a-d*.

To fully form each of the suspension rods 520*a-d*, the first section and the second section of each of the suspension rods 520*a-d* may be connected though a respective one of the isolation spring components 530*a-d*. Specifically, a first section of a respective one of the suspension rods 520*a-d* may be disposed through a lower portion of a respective one of the isolation spring components 530*a-d*, and a second section of a respective one of the suspension rods 520*a-d* may be disposed through an upper portion of a respective one of the isolation spring components 530*a-d*.

The first and second sections of each of the suspension rods 520*a-d* may be connected with a respective one of the isolation spring components 530*a-d* using one or more fasteners. Each of the fasteners may be, for example, a nut with a threaded hole configured to mate with a respective one of the suspension rods 520*a-d*, which may be correspondingly threaded. An embodiment of at least one of the isolation spring components 530*a-d* and the connection with a respective one of the suspension rods 520*a-d* using one or more fasteners may be illustrated with respect to FIG. 6, infra.

In various embodiments, the first section of each of the suspension rods 520*a-d* may be connected with the lower portion of a respective one of the isolation spring components 530*a-d* through at least one spherical washer. Further, the second section of each of the suspension rods 520*a-d* may be connected with the upper portion of a respective one of the isolation spring components 530*a-d* through at least one spherical washer. Each of the spherical washers may be disposed on a respective one of the suspension rods 520*a-d* between one or more fasteners and a portion of a respective one of the isolation spring components 530*a-d*. An embodiment of at least one of the isolation spring components 530*a-d* and the connection with a respective one of the suspension rods 520*a-d* through the at least one spherical washer may be illustrated with respect to FIG. 6, infra.

The isolation spring components 530*a-d* may provide a mechanism to prevent and/or correct for unintended movement of the metrology apparatus 402, which may accordingly prevent and/or correct for unintended movement of the metrology device 408. For example, the isolation spring components 530*a-d* may be configured to absorb vibration and provide a damping mechanism to prevent and/or correct for unintended movement of the metrology apparatus 402. Further, the spherical washers may provide an additional corrective measure against unintended movement of the metrology apparatus 402. For example, the spherical washers may facilitate the accurate repositioning of the metrology apparatus 402 by allowing the metrology apparatus 402 to return (e.g., "settle") into an approximately original position after experiencing an unintended movement.

Figure 6:
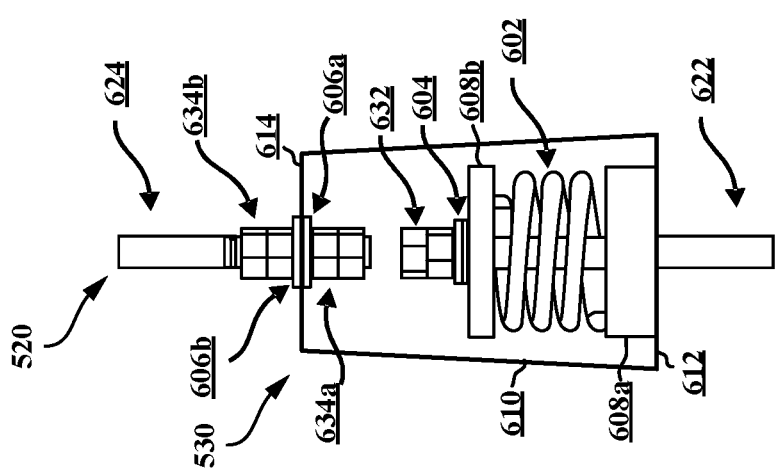
FIG. 6 illustrates a perspective view of a first portion of a metrology apparatus.

FIG. 6 illustrates an embodiment of an isolation spring component 530 and, therefore, the illustrated isolation spring component 530 may be at least one of the isolation spring components 530a-d of FIG. 5. As described with respect to FIG. 5, supra, a suspension rod 520 (e.g., at least one of the suspension rods 520a-d of FIG. 5) may be divided into two sections: a first section 622 that may include a respective one of the distal ends 522a-d of a respective one of the suspension rods 520a-d, and a second section 624 that may include a respective one of the proximal ends 524a-d of the respective one of the suspension rods 520a-d. The first section 622 and the second section 624 may not be directly connected and may not be in direct contact.

The isolation spring component 530 may include a casing 610, which may at least partially enclose or house the isolation spring component 530. The isolation spring component 530 may include a lower portion 612, which may include a bottom surface of the casing 610. Further, the isolation spring component 530 may include an upper portion 614, which may include a top surface of the casing 610. The lower portion 612 and the upper portion 614 may be disposed at opposite ends of the casing 610.

An isolation spring 602 may be positioned at least partially within the casing 610. In the illustrated embodiment, the isolation spring 602 may be a coil spring. The isolation spring 602 may be connected with the lower portion 612 of the isolation spring component 630. The isolation spring 602 may be contained by a bottom cup 608a at the bottom of the isolation spring 602 and a top cup 608b at the top of the isolation spring 602. In some embodiments, the bottom cup 608a may be directly connected with the bottom surface of the lower portion 612 of the isolation spring component 530. The isolation spring 602 may be configured to absorb vibration and provide a damping mechanism.

The lower portion 612 of the isolation spring component 530 may include a hole from an exterior of the casing 610 to the interior of the casing 610. The first section 622 of the suspension rod 520 may be disposed through the hole of the lower portion 612 so that the first section 622 extends into the interior of the casing 610. Further, the first section 622 of the suspension rod 520 may extend through the isolation spring 602, e.g., at approximately the center of the isolation spring 602. For example, the isolation spring 602 may coil around the first section 622 of the suspension rod 520.

The bottom cup 608a and the top cup 608b may each include a hole, e.g., proximate to a respective center of the bottom and top cups 608a-b. The first section 622 of the suspension rod 520 may extend through the lower portion 612, through the hole of the bottom cup 608a, through the isolation spring 602, and through the hole of the top cup 608b. The first section 622 of the suspension rod 520 may extend beyond the top cup 608b, e.g., so that the first section 622 protrudes within the casing 610.

The first section 622 of the suspension rod 520 may be connected to the lower portion 612 of the isolation spring component 530 with one or more fasteners 632. The one or more fasteners 632 may be fastened or mated with the first section 622 of the suspension rod 520 where the first section 622 protrudes beyond the top cup 608b within the casing 610. For example, the one or more fasteners 632 may include at least one nut having a threaded hole configured to mate with threads of the first section 622 protruding beyond the top cup 608b.

In some embodiments, the first section 622 of the suspension rod 520 may connect with the isolation spring component 530 through at least one spherical washer 604, and the first section 622 may extend through the at least one spherical washer 604 to mate with the one or more fasteners 632. Therefore, the at least one spherical washer 604 may be positioned on the first section 622 of the suspension rod 520 between the at least one fastener 632 and the top cup 608b. In some embodiments, the at least one spherical washer 604 may include at least one spherical spring washer and/or spherical flat washer.

Similar to the lower portion 612, the upper portion 614 of the isolation spring component 530 may include a hole from an exterior of the casing 610 to the interior of the casing 610. The second section 624 of the suspension rod 520 may be disposed through the hole of the upper portion 614 so that the second section 624 extends into the interior of the casing 610.

The second section 624 of the suspension rod 520 may be connected to the upper portion 614 of the isolation spring component 530 with a first set of fasteners 634a and/or a second set of fasteners 634b (e.g., in some embodiments, the absence of the second set of fasteners 634b may provide some redundancy to the metrology apparatus 402). Where the second section 624 of the suspension rod 520 extends through the upper portion 614 into the interior of the casing 610, the second section 624 may be connected with the upper portion 614 with the first set of fasteners 634a. For example, the first set of fasteners 634a may include at least one nut having a threaded hole configured to mate with threads of the second section 624 where the second section 624 extends into the interior of the casing 610.

In some embodiments, the second section 624 of the suspension rod 520 extending into the casing 610 of the isolation spring component 530 may connect with the upper portion 614 of the isolation spring component 530 through at least one spherical washer 606a. The second section 624 of the suspension rod 520 may extend through the at least one spherical washer 606a to engage with the first set of fasteners 634a. Therefore, the at least one spherical washer 606a may be positioned on the second section 624 of the suspension rod 520 between the top surface of the upper portion 614 of the isolation spring component 530 and the first set of fasteners 634a. In some embodiments, the at least one spherical washer 606a may include at least one spherical spring washer and/or spherical flat washer.

In addition, where the second section 624 of the suspension rod 520 is disposed at an exterior of the casing 610, the second section 624 may be connected with the upper portion 614 with the second set of fasteners 634b. For example, the second set of fasteners 634b may include at least one nut having a threaded hole configured to mate with threads of the second section 624 where the second section 624 extends beyond the exterior of the casing 610.

Further, the second section 624 of the suspension rod 520 disposed outside of the casing 610 of the isolation spring component 530 may connect with the upper portion 614 of the isolation spring component 530 through at least one spherical washer 606b. The second section 624 of the suspension rod 520 may extend through the at least one spherical washer 606b and engage with the second set of fasteners 634b. Therefore, the at least one spherical washer 606b may be positioned on the second section 624 of the suspension rod 520 between the top surface of the upper portion 614 of the isolation spring component 530 and the second set of fasteners 634b. In some embodiments, the at least one spherical washer 606b may include at least one spherical spring washer and/or spherical flat washer.

Figure 7:
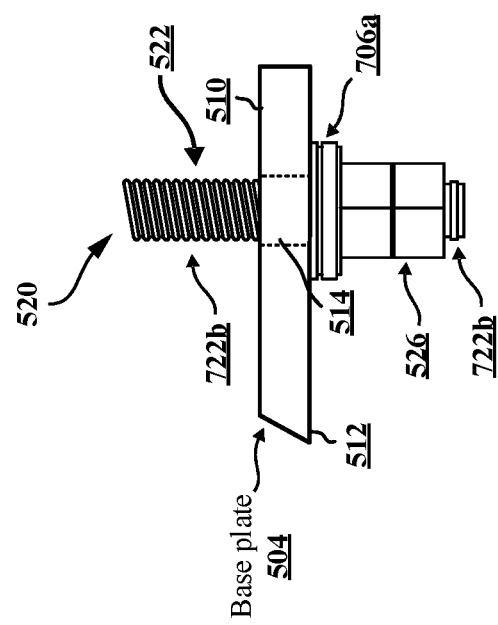
FIG. 7 illustrates perspective views of a second portion of a metrology apparatus.

FIG. 7 illustrates an embodiment of a connection of a suspension rod 520 with a base plate 504 and, therefore, the illustrated suspension rod 520 may be at least one of the suspension rods 520a-d of FIG. 5. As described with respect to FIG. 5, supra, a suspension rod 520 (e.g., at least one of the suspension rods 520a-d of FIG. 5) may be connected with a base plate 504. The base plate 504 may include a hole 514 (e.g., at least one of the holes 514a-d) that is through the base plate 504 from the top surface 510 to the bottom surface 512.

Referring to FIG. 7, the illustrated suspension rod 520 may include the distal end 522.

The distal end 522 may be positioned through the hole 514, and therefore, a first portion 722a of the distal end 522 may be disposed at the top surface 510 of the base plate 504, while a second portion 722b of the distal end 522 may be disposed at the bottom surface 512 of the base plate 504.

The second portion 722b of the distal end 522 of the suspension rod 520 may be connected to the base plate 504 with a first set of fasteners 526 (e.g., at least one of the first sets of fasteners 526a-d of FIG. 5). For example, the first set of fasteners 526 may include at least one nut having a threaded hole that may mate with threads on the second portion 722b of the distal end 522 of the suspension rod 520. In some embodiments, the first set of fasteners 526 may include two fasteners.

Additionally, the suspension rod 520 may be connected with the base plate 504 through at least one spherical washer 706a. Accordingly, the at least one spherical washer 706a may be disposed around the second portion 722b of the distal end 522 of the suspension rod 520, and may be positioned between the base plate 504 and the first set of fasteners 526. In some embodiments, the at least one spherical washer 706a may include at least one spherical spring washer and/or spherical flat washer.

FIG. 7 illustrates an embodiment in which a first set of fasteners 526 connects the suspension rod 520 with the base plate 504 at a second portion 722b of the distal end 522 of the suspension rod 520, whereas the first portion of the 722a of the distal end 522 is not connected to the base plate 504 with a set of fasteners.

In addition, the first portion 722a of the distal end 522 of the suspension rod 520 may be connected with the base plate 504 with a second set of fasteners 528 (e.g., at least one of the second sets of fasteners 528a-d of FIG. 5). The second set of fasteners 528 may include at least one nut having a threaded hole that may mate with threads on the first portion 722a of the distal end 522 of the suspension rod 520. In some embodiments, the second set of fasteners 528 may include two fasteners.

Additionally, the suspension rod 520 may be connected with the base plate 504 through at least one spherical washer 706b. Accordingly, the at least one spherical washer 706b may be disposed around the first portion 722a of the distal end 522 of the suspension rod 520, and may be positioned between the base plate 504 and the second set of fasteners 528. In some embodiments, the at least one spherical washer 706b may include at least one spherical spring washer and/or spherical flat washer.

The spherical washers 706a-b through which the suspension rods 520a may be connected with the base plate 504 may provide a corrective measure against unintended movement of the metrology apparatus 402. For example, the spherical washers 706a-b may facilitate the accurate repositioning of the metrology apparatus 402 by causing the metrology apparatus 402 to return (e.g., "settle") into an approximately original position after experiencing an unintended movement. Correspondingly, the spherical washers 706a-b may prevent and/or correct for unintended movement of the metrology device 408 connected with the metrology apparatus 402.

The present disclosure is provided to enable any person skilled in the art to practice the various aspects described herein. Various modifications to these exemplary embodiments presented throughout the present disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout the present disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus comprising:
   a base plate having a top surface and a bottom surface, the base plate including a plurality of holes from the top surface to the bottom surface;
   a plurality of suspension rods, a distal end of a respective suspension rod positioned through a respective hole such that a first portion of the distal end is disposed on the top surface of the base plate and a second portion of the distal end is disposed on the bottom surface of the base plate,
   wherein a metrology device is connected to the bottom surface of the base plate such that at least a portion of an assembly cell is within a field of view of the metrology device.

2. The apparatus of claim 1, wherein the respective suspension rod is connected with the base plate through at least one spherical washer that is connected with the second portion of the distal end of the respective suspension rod disposed on the bottom surface of the base plate.

3. The apparatus of claim 1, wherein the respective suspension rod is connected with the base plate through at least one spherical washer that is connected with the first portion of the distal end of the respective suspension rod disposed on the top surface of the base plate.

4. The apparatus of claim 1, wherein the respective suspension rod is divided by an isolation spring component that includes an isolation spring.

5. The apparatus of claim 4, wherein a first section of the respective suspension rod is disposed through a lower portion of the isolation spring component, and wherein a second section of the respective suspension rod is connected with an upper portion of the isolation spring component and connected with the isolation spring component through a first spherical washer.

6. The apparatus of claim 1, further comprising:
   a weight component positioned on the top surface of the base plate, the weight component configured to provide stability against unintended movement of the apparatus.

7. The apparatus of claim 1, wherein the metrology device comprises at least one of a camera or a laser tracker.

8. The apparatus of claim 1, wherein the metrology device is configured to provide metrology data to a computer configured to control one or more robotic apparatuses at least partially within the assembly cell that is within the field of view of the metrology device.

9. The apparatus of claim 1, wherein the apparatus is positioned overhead relative to the assembly cell, and the field of view of the metrology device comprises an aerial view of the assembly cell below the apparatus.

\* \* \* \* \*